United States Patent Office 3,824,244
Patented July 16, 1974

3,824,244
3-(4-HALOPHENYL)-3-(2-PYRIDYL)-3,4-DIHYDRO ISOCOUMARINS
William J. Houlihan, Mountain Lakes, and Jeffrey Nadelson, Lake Parsippany, N.J., assignors to Sandoz-Wander, Inc., Hanover, N.J.
No Drawing. Filed Apr. 21, 1972, Ser. No. 246,352
Int. Cl. C07d 31/34
U.S. Cl. 260—295 F       2 Claims

ABSTRACT OF THE DISCLOSURE

Phenyl and substituted phenyl pyrido benzazepines and benzoquinolizines, e.g. 11(4 - chlorophenyl) - 1,3,4,11a-tetrahydro-2H-benzo - [b] - quinolizine-6-(11h)-one, and 12-hydroxy-12-phenyl - pyrido - [1,2-b][2]-benzazepin-6-one, are useful as major tranquilizers.

This invention relates to benzo quinolizines and pyrido benzazepines. The invention also pertains to intermediates for said compounds, and to acid addition salts of certain of these compounds, and to processes for their preparation.

Certain of the compounds of this invention may be represented by the following structural formula:

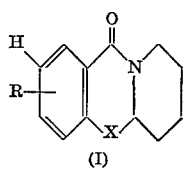

(I)

where

X represents

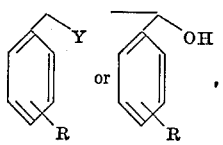

Y is H or OH, and
R represents H, or halo of atomic weight about 19–36.

Certain of the compounds of formula (I), particularly the compounds of the formula:

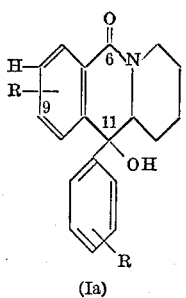

(Ia)

where R is as defined above, may be prepared from certain other compounds of formula (I), particularly compounds of the formula:

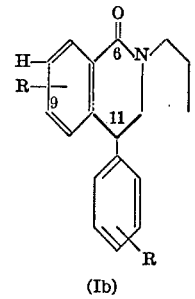

(Ib)

where R is as defined above, by treating the latter in inert solvent either with a strong base such as an alkali metal hydride, such as sodium hydride or lithium hydride in e.g. dimethyl formamide, or with a tertiary butoxide such as tertiary potassium butoxide in, e.g. tertiary butanol, in the presence of air or oxygen, and preferably by bubbling same through the reaction mixture. The temperature of reaction may be about 20–100° C., conveniently at room temperature, for about 5–24 hours, preferably about 16–20 hours.

The compounds of formula (Ib) are prepared from novel compounds of the formula:

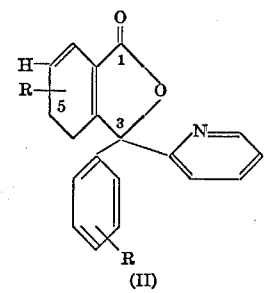

(II)

where R is as defined above, by hydrogenating the latter at about 40–60 lbs., per square inch, preferably about 50 lbs. per square inch, in the presence of platinum metal catalysts such as platinum oxide, palladium on carbon and the like, in acidic solvents, preferably glacial acetic acid. The hydrogenation may take place at about 20–70° C., conveniently at room temperature, preferably until about 4 equivalents of hydrogen are absorbed.

According to an additional aspect of this invention, compounds of the formula:

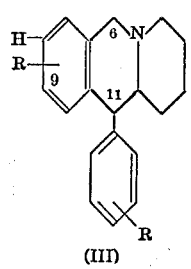

(III)

where R is as defined above, are obtained from compounds of the formula (Ib) by reducing the latter with hydride reducing agent, preferably lithium aluminum hydride, in ether solvent such as diethyl ether, tetrahydrofuran and the like, at about 50–150° C. conveniently at the reflux temperature of the solvent, for about 5–24 hours, preferably about 16–20 hours, followed by conventional hydrolysis.

According to a still further aspect of this invention, those compounds of formula (I) having the structure.

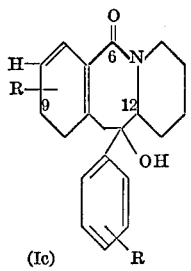

(Ic)

where R is as defined above are obtained from compounds of the formula:

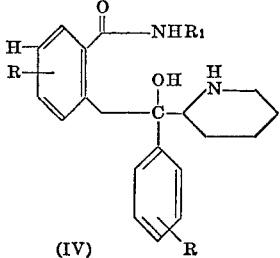

(IV)

where

R is as defined above, and $R_1$ represents straight chain lower alkyl of 1-4 carbon atoms, e.g. methyl, ethyl or propyl.

Compounds (Ic) are obtained by heating compounds (IV) optionally in inert solvent, such as ethyl ether or tetrahydrofuran, hydrocarbons or halogenated hydrocarbons such as hexane, heptane, benzene, toluene, o-dichlorobenzene and the like at about 100–220° C., preferably about 140–160° C. for about 15–48 hours, preferably about 16–28 hours. Yields may be improved and a better quality product obtained by performing the reaction under inert atmosphere, e.g. nitrogen gas.

Compounds (IV) are obtained from compounds of the formula:

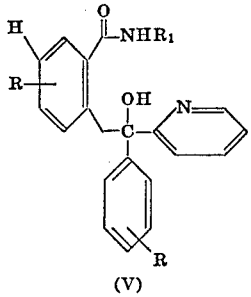

(V)

where R and $R_1$ are as defined above, by hydrogenating compounds (V) in the same manner indicated for converting compounds (II) to compounds (Ib), except that in this instance the hydrogenation is preferably performed until about 3 equivalents of hydrogen are reacted.

A still further aspect of the invention concerns the preparation of compounds of the formula:

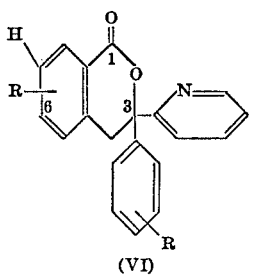

(VI)

where R is as defined above, from compounds of formula (V) by treating compounds (V) in the manner indicated above involving the conversion of compounds (IV) to compounds (Ic).

Compounds (II) and compounds (VI) are prepared in a similar manner from compounds (VII) and (VIII) according to the following reaction scheme:

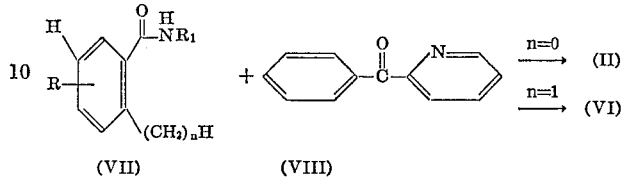

where R and $R_1$ are as defined above.

Compounds (II) and (VI) are obtained by first lithiating compounds (VII), e.g. by use of lower alkyl or aryl lithium compound such as n-butyl lithium in inert hydrocarbon or other solvent, e.g. benzene, toluene, ethyl ether, tetrahydrofuran, and the like, to obtain a dilithio intermediate thereof, which in turn is normally not recovered but is treated with compound (VIII) and subjecting the reaction mixture to conventional hydrolysis, preferably with aqueous ammonium chloride. The lithiation is preferably performed at a temperature between about −60 to +10° C. for 1–3 hours. The condensation may be carried out at a temperature of from about −60 to −20° C., preferably −60 to −40° C., for about 1–3 hours. The hydrolysis is performed in a standard manner in a temperature of from about −20 to 10° C.

In each of the above reactions, the particular temperature and solvent utilized is not critical. Additionally, except where otherwise indicated, the products of each of said reactions are recovered by conventional techniques such as crystallization, filtration, trituration and the like.

Certain of the compounds of formulas (VII) and (VIII) are known and may be prepared according to methods disclosed in the literature. The compounds of formulas (VII) and (VIII) not specifically disclosed may be prepared from methods analogous to those in the literature from known compounds.

Certain of the compounds of formulas I, II, III, IV, V and VI exist in racemic form or in the form of optically active isomers. The separation and recovery of respective isomers may be readily accomplished employing conventional techniques, and such isomers are included within the scope of the invention.

Compounds (II), (III), (IV), (V) and (VI) may exist in the form of their acid addition salts. Said salts and their respective free bases may be converted from one to the other by conventional techniques, and are chemically interchangeable for purposes of the above-described processes.

The compounds of formulas (I), (II), (III), and (VI) are useful because they possess pharmacological properties in animals, such as mammals. In particular, the compounds may be used as major tranquilizers to overcome psychoses as indicated by their activity in mice administered active agent at a dose of 50–400 mg./kg. of animal body weight of test animals using a thirty-word adjective check sheet method basically as described by S. Irwin (Gordon Research Conference, Medicinal Chemistry, 1959) and Chen (Symposium on Sedative and Hypnotic Drugs, Williams and Wilkins, 1954), and by noting the locomotor activity of the test animals with the aid of an actophotometer wherein the test drug is administered intraperitoneally and interaction of the compound with amphetamine sulphate (2.5 mg./kg., i.p.) is observed.

For such usage, the compounds of formulas (I), (II), (III), and (VI)) may be combined with a pharmaceutically acceptable carrier or adjuvant, and may be administered orally in such forms as tablets, capsules, elixers, suspensions and the like, or parenterally in the form of an injectable solution or suspension. The dosage will vary depending upon the mode of administration utilized and the particular compound employed.

As indicated above, the compounds of formulas (II), (III), (IV), (V) and (VI) may be similarly administered in the form of their nontoxic pharmaceutically acceptable acid addition salts. Such salts possess the same order of activity as the free base and are included within the scope of the invention. Representative of such salts are the mineral acid salts, such as hydrochloride, hydrobromide, sulfate, phosphate and the like and the organic acid salts, such as the succinate, benzoate, acetate, p-toluenesulfonate, benzenesulfonate and the like.

As noted above, the compounds of formulas I, II, III, IV, V and VI exist as optical isomers. In some cases, greater pharmacological activity or other beneficial attribute may be found for a particular isomer and in such instances administration of such isomer may be preferred.

In general, satisfactory results are obtained when the compounds (I), (II), (III), and (VI) are administered orally at a daily dosage of from about 4–400 mg./kg. of animal body weight, preferably given in divided doses, two to four times a day or in sustained release form. For most large mammals (e.g. primates) the total daily dosage is from about 300–3,000 mg. per day. Dosage forms suitable for internal use comprise from about 75–1,500 mg. of active compound in intimate admixture with a solid or liquid pharmaceutically acceptable carrier or diluent.

A tablet containing 75 mg. of 11-(4 - chlorophenyl)-1,3,4,11a-tetrahydro - 2H-benzo - [b]-quinolozine - 6-(11h)-one and 225 mg. of lactose is prepared by conventional techniques and is useful in overcoming psychoses in accordance with this invention at a dosage of one capsule two to four times a day.

EXAMPLE 1

3-(4-chlorophenyl)-3-(2-pyridyl) phthalide

To a flask equipped with a stirrer, dropping funnel, condenser and gas inlet tube maintained under a nitrogen atmosphere there is added at room temperature 37.8 g. (0.28 mole) of N-methyl benzamide and 250 ml. of anhydrous tetrahydrofuran. The reaction flask is immersed in an ice bath and cooled to an internal temperature of 5° C. Stirring is initiated and 380 ml. of 1.6 M. n-butyllithium (0.616 mole) in hexane is added dropwise in *ca.* 1 hour maintaining the temperature below 8° C. The resulting dilithio salt is stirred at 5° C. for 1 additional hour and the reaction flask is then immersed in a Dry Ice acetone bath and cooled to an internal temperature of —60° C. To the cold reaction mixture a solution of 60.7 g. (0.28 mole) of p-chloro-2-benzoyl pyridine in 140 ml. anhydrous tetrahydrofuran is added dropwise in *ca.* 45 min. maintaining the temperature between —60° C. and —50° C. The resulting reaction mixture is stirred at —60° C. for 1 hour, allowed to warm to 0° C. in *ca.* 1 hour, and then treated with 200 ml. of saturated aqueous ammonium chloride while maintaining the temperature below 10° C. The resulting solid is filtered, washed thoroughly with water and recrystallized from methylene chloride-ether (1:1) to give 3-(4-chlorophenyl) -3- (2-pyridyl) phthalide, m.p. 84.5–85.5° C.

When the above process is carried out and in place of N-methyl benzamide there is used p-chloro N-methyl benzamide, there is obtained 5-chloro-3-(4-chlorophenyl)-3-(2-pyridyl) phthalide.

When the above detailed process is carried out and in place of p-chloro-2-benzoyl pyridine there is used 2-benzoyl pyridine, there is obtained 3-phenyl-3-(2-pyridyl) phthalide.

EXAMPLE 2

11-(4-chlorophenyl)-1,3,4,11a-tetrahydro-2H-benzo[b]quinolizin-6(11H)one

A mixture of 32.1 g. (0.1 mole) of 3-(4-chlorophenyl)-3-(2-pyridyl) phthalide, 3.2 g. of platinum oxide and 500 ml. of glacial acetic acid is hydrogenated at 50 p.s.i. and room temperature until 4 equivalents of hydrogen are absorbed. The mixture is filtered to remove the catalyst, evaporated in vacuo, the residue dissolved in methylenechloride, washed with 2× 100 ml. of water, 1× 50 ml. of 10% sodium carbonate, dried over magnesium sulfate, filtered, and evaporated in vacuo. The residue is triturated with ether to give 11-(4-chlorophenyl)-1,3,4,11a-tetrahydro-2H - benzo[b]quinolizin-6-one; m.p. 177–179° C.

When the above process is carried out and in place of 3-(4-chlorophenyl) - 3 - (2-pyridyl) phthalide there is used (a) 5-chloro-3 - (4 - chlorophenyl)-3-(2-pyridyl) phthalide or
(b) 3-phenyl-3-(2-pyridyl) phthalide, there is obtained (a) 9 - chloro - 11-(4-chlorophenyl) - 1,3,4,11a-tetrahydro-2H-benzo[b]quinolizin-6(11H)-one,
or
(b) 11 - phenyl-1,3,4,11a-tetrahydro-2H-benzo[b]quinolizin-6(11H)-one, respectively.

EXAMPLE 3

11-(4-chlorophenyl)-11-hydroxy-1,3,4,11a-tetrahydro-2H-benzo[b]quinolizin-6(11H)-one To a suspension of 4.6 g. of 50% sodium hydride in mineral oil (0.1 mole) in 500 ml. of dry dimethyl formamide is added 31.2 g. (0.1 mole) of 11-(4 - chlorophenyl)1,3,4,11a-tetrahydro - 2H - benzo[b]quinolizin-6(11H) - one as a solid in portions. The mixture is stirred one hour at room temperature and then an additional 18 hours at room temperature while bubbling in a stream of air. The mixture is cooled in ice and 50 ml. of ethanol is added dropwise. The solvents are removed in vacuo, the residue dissolved in methylenechloride and washed with water, dried over magnesium sulfate, filtered and evaporated in vacuo. The residue is triturated with ether to give 11 - (4-chlorophenyl) - 11 - hydroxy-1,3,4,11a-tetrahydro - 2H - benzo[b]quinolizin-6(11H) - one; m.p. 216–217.5° C.

When the above process is carried out and in place of 11 - (4 - chlorophenyl) - 1,3,4,11a- tetrahydro - 2H-benzo[b]quinolizin-6(11H)-one there is used (a) 9-chloro-11-(4-chlorophenyl)-1,3,4,11a-tetrahydro-2H-benzo[b]quinolizin-6(11H)-one, or
(b) 11-phenyl-1,3,4,11a-tetrahydro-2H-benzo[b]quinolizin-6(11H)-one there is obtained (a) 9-chloro-11-(4-chlorophenyl)-11-hydroxy-1,3,4,11a-tetrahydro-2H-benzo[b]quinolizin-6(11H)-one, or
(b) 11-hydroxy-11-phenyl-1,3,4,11a-tetrahydro-2H-benzo[b]quinolizin-6(11H)-one, respectively.

When the above reaction is carried out and tertiary potassium butoxide in tertiary butanol is used in place of sodium hydride in dimethyl formamide, the identical products are again obtained.

EXAMPLE 4

11-(4-chlorophenyl)-1,3,4,6,11,11b-hexahydro-2H-benzo[b]quinolizine

To a suspension of 7.6 g. of lithium aluminum hydride (0.2 mole) in 500 ml. of tetrahydrofuran under nitrogen a solution of 32.8 g. (0.1 mole) of 11-(4-chlorophenyl)-11 - hydroxy - 1,3,4,11a - tetrahydro - 2H - benzo[b]quinolizin-6(11H)-one in 200 ml. of tetrahydrofuran is added dropwise with stirring. The mixture is refluxed 18 hours, cooled in an ice bath and hydrolyzed by the addition of ethyl acetate and water. The resulting salts are filtered, washed with tetrahydrofuran, and the combined organic phases dried over magnesium sulfate, filtered and evaporated. The residue is triturated with ether to give 11 - (4 - chlorophenyl) - 1,3,4,6,11,11b - hexahydro - 2H-benzo[b]quinolizine, m.p. 125–126° C.

When the above process is carried out and in place of 11 - (4 - chlorophenyl) - 11 - hydroxy - 1,3,4,11a - tetrahydro-2H-benzo[b]quinolizin-6(11H)-one there is used (a) 9-chloro-11-(4-chlorophenyl)-11-hydroxy-1,3,4,11a-tetrahydro-2H-benzo[b]quinolizin-6(11H)-one, or
(b) 11-hydroxy-11-phenyl-1,3,4,11a-tetrahydro-2H-benzo[b]quinolizin-6(11H)-one, there is obtained (a) 9-chloro-11(4-chlorophenyl)-1,3,4,6,11,11b-hexahydro-2H-benzo[b]quinolizine, or
(b) 11-phenyl-1,3,4,6,11,11b-hexahydro-2H-benzo[b]quinolizine, respectively.

EXAMPLE 5 o-(α-hydroxy-α-[2-pyridyl] phenethyl)-N-methyl benzamide

To a flask equipped with a stirrer, dropping funnel, condenser and gas inlet tube maintained under a nitrogen atmosphere there is added at room temperature 40.0 g. (0.28 mole) of o-methyl-N-methyl benzamide and 250 ml. of anhydrous tetrahydrofuran. The reaction flask is immersed in an ice bath and cooled to an internal temperature of 5° C. Stirring is initiated and 380 ml. of 1.6 M. n-butyllithium (0.616 mole) in hexane is added dropwise in ca. 1 hour maintaining the temperature below 8° C. The resulting dilithio salt is stirred at 5° C. for 1 additional hour and the reaction flask is then immersed in a Dry Ice acetone bath and cooled to an internal temperature of −60° C. To the cold reaction mixture a solution of 51.3 g. (0.28 mole) of 2-benzoyl pyridine in 140 ml. anhydrous tetrahydrofuran is added dropwise in ca. 45 minutes maintaining the temperature between −60° C. and −50° C. The resulting reaction mixture is stirred at −60° C. for 1 hour, allowed to warm to 0° C. in ca. 1 hour, and then treated with 200 ml. of saturated aqueous ammonium chloride while maintaining the temperature below 10° C. The resulting solid is filtered, washed thoroughly with water and recrystallized from methylene chloride-ether (1:1) to give o-(α-hydroxy-α-[2-pyridyl]-phenethyl)-N-methyl benzamide; M.P. 101.5–103.5° C.

When the above detailed process is carried out and in o-methyl-N-methyl benzamide, there is used 4-chloro-2,N-dimethyl benzamide, there is obtained 4-chloro-2-(α-hydroxy-α-[2-pyridyl]-phenethyl)-N-methyl benzamide.

When the above detailed process is carried out and in place of 2-benzoyl pyridine there is used p-chloro-2-benzoyl pyridine, there is obtained o-(4-chloro-α-hydroxy-α-[2-pyridyl]-phenethyl)-N-methyl benzamide.

EXAMPLE 6 o-(α-hydroxy-α-[2-pyridyl] phenethyl)-N-methyl benzamide

To a flask equipped with a stirrer, condenser and gas inlet tube maintained under a nitrogen atmosphere there is added at room temperature 16.2 g. (0.05 mole) o-(α-hydroxy-α-[2-pyridyl]-phenethyl)-N-methyl benzamide and 170 ml. of o-dichloro benzene. Stirring is initiated and the mixture is heated at reflux for 18 hours. The excess o-dichloro benzene is then removed by distillation in vacuo and the resulting oil is crystallized from ether to give 3-phenyl-3-(2-pyridyl)-3,4-dihydro isocoumarin.

When the above process is carried out and in place of o-(α-hydroxy-α-[2-pyridyl]-phenethyl)-N-methyl benzamide there is used o-(4-chloro-α-hydroxy-α-[2-pyridyl]-phenethyl)-N-methyl benzamide, there is obtained 3-(4-chlorophenyl) - 3 - (2-pyridyl)-3,4-dihydro isocoumarin; m.p. 157–158° C.

When the above detailed process is carried out and in place of o-(α-hydroxy-α-[2-pyridyl]-phenethyl)-N-methyl benzamide there is used 4-chloro-2-(α-hydroxy-α-2-[pyridyl]-phenethyl)-N-methyl benzamide, there is obtained 6-chloro-3-phenyl-3-(2-pyridyl)-3,4-dihydro isocoumarin.

EXAMPLE 7 o-(α-hydroxy-α-[2-piperidyl]-phenethyl)-N-methyl benzamide

A mixture of 16.2 g. (0.05 mole) of o-(α-hydroxy-α-[2 - pyridyl] - phenethyl) - N-methyl benzamide, 2 g. of platinum oxide, and 250 ml. of glacial acetic acid is treated with hydrogen at 50 p.s.i. and room temperature until 3 equivalents of hydrogen are absorbed. The catalyst is removed by filtration and the solvents evaporated in vacuo. The residue is dissolved in methylene chloride, washed with 2× 100 ml. of 2N sodium hydroxide, dried over magnesium sulfate, filtered and evaporated in vacuo. The residue is triturated with ether to give o-(α-hydroxy-α-[2-piperidyl]-phenethyl)-N-methyl benzamide.

When the above process is carried out and in place of o - (α - hydroxy-α-[2-pyridyl]-phenethyl)-N-methyl benzamide there is used (a) 4 - chloro - 2 - (α-hydroxy-α-[2-pyridyl]-phenethyl)-N-methyl benzamide, or
(b) o - (4 - chloro-α-hydroxy-α-[2-pyridyl]-phenethyl)-N-methyl benzamide, there is obtained (a) 4 - chloro - 2 - (α-hydroxy-α-[2-piperidyl]-phenethyl)-N-methyl benzamide, or
(b) o - (4 - chloro - α-hydroxy-α-[2-piperidyl]-phenethyl)-N-methyl benzamide, respectively.

EXAMPLE 8

12-hydroxy-12-phenyl-pyrido[1,2-b][2] benzazepin-6-one

A mixture of 33.8 g. (0.1 mole) of o-(α-hydroxy-α-[2 - piperidyl] - phenethyl) - N-methyl benzamide and 500 ml. of o-dichlorobenzene is heated at reflux for 18 hours. The mixture is cooled and the solvent removed in vacuo. The residue is dissolved in ether and washed first with 2N hydrochloric acid and then with water. The organic layer is dried over magnesium sulfate, filtered, evaporated in vacuo and the residue recrystallized from ethyl acetate to give 12 - hydroxy-12-phenyl-pyrido[1,2-b][2]benzazepin-6-one; M.P. 184.5–188° C.

When the above process is carried out and in place of o - (α - hydroxy - α - [2-piperidyl]-phenethyl)-N-methyl benzamide there is used (a) 4 - chloro - 2 - (α-hydroxy-α-[2-piperidyl]-phenethyl-N-methyl benzamide, or
(b) o - (4 - chloro - α-hydroxy-α-[2-piperidyl]-phenethyl)-N-methyl benzamide, there is obtained (a) 9 - chloro - 12 - hydroxy-12-phenyl-pyrido-[1,2-b][2]benzazepin-6-one, or
(b) 12 - hydroxy - 12 - (4-chlorophenyl)-pyrido-[1,2-b][2]benzazepin-6-one, respectively.

What is claimed is:
1. A compound of the formula
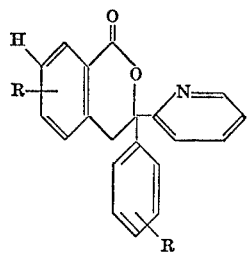
where R represents H or halo of atomic weight about 19–36,
or a pharmaceutically acceptable acid addition salt thereof.
2. A compound according to claim 1 which is 3-(4-chlorophenyl)-3-(2-pyridyl)-3,4-dihydro isocoumarin.
References Cited
UNITED STATES PATENTS
3,712,904  1/1973  Bode et al. _____ 260—295 F
ALAN L. ROTMAN, Primary Examiner
U.S. Cl. X.R.
260—286 R, 289 R, 239.3 P, 293.77, 295 AM; 424—258